United States Patent
Harada et al.

(10) Patent No.: US 7,339,342 B2
(45) Date of Patent: Mar. 4, 2008

(54) STEPPER MOTOR CONTROLLING APPARATUS AND PEN RECORDER

(75) Inventors: Naoyuki Harada, Tokyo (JP); Hiroshi Otawa, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 111 days.

(21) Appl. No.: 11/302,188

(22) Filed: Dec. 14, 2005

(65) Prior Publication Data
US 2006/0152187 A1    Jul. 13, 2006

(30) Foreign Application Priority Data
Dec. 16, 2004    (JP)    .......................... P. 2004-364181

(51) Int. Cl.
*G05B 19/40*    (2006.01)
(52) U.S. Cl. ...................... 318/685; 318/599; 318/567
(58) Field of Classification Search ............... 318/685, 318/599, 567; 365/45; 388/804, 912
See application file for complete search history.

(56) References Cited

U.S. PATENT DOCUMENTS 4,910,706 A * 3/1990 Hyatt .......................... 365/45

FOREIGN PATENT DOCUMENTS

| JP | 8-149892 A | 6/1996 |
| JP | 10-150798 A | 6/1998 |

* cited by examiner

*Primary Examiner*—Karen Masih
(74) *Attorney, Agent, or Firm*—Sughrue Mion, PLLC

(57) ABSTRACT

A stepper motor controlling apparatus has a driver which drives a stepper motor in response to an input pulse signal, a PWM controlling section which changes a duty ratio of the pulse signal fed to the driver to control a rotation of the stepper motor, a pulse encoder which rotates in response to the rotation of the stepper motor, and outputs a pulse according to a position of a moving object, a position counter which counts the pulse output from the pulse encoder to sense a present position of the moving object, and a pulse rate controlling section which controls an update latency time of the pulse signal according to a deviation between a target position of the moving object and the present position.

13 Claims, 8 Drawing Sheets

FIG. 2

| DEVIATION | UPDATE LATENCY TIME |
|---|---|
| 0 | 22.0msec |
| 1 | 15.6msec |
| 2 | 7.8msec |
| 3 | 5.2msec |
| 4 | 3.9msec |
| 5 | 3.1msec |
| . | . |
| . | . |
| . | . |
| 63 | 0.1msec |
| 64 OR MORE | 0msec |

| No. | ANGLE OF sin $\theta$ | | VALUE OF sin $\theta$ | | TWO-PHASE EXCITATION POINT |
|---|---|---|---|---|---|
| | A PHASE | B PHASE | A PHASE | B PHASE | |
| 0 | 15 | 285 | 0.26 | -0.97 | |
| 1 | 45 | 315 | 0.71 | -0.71 | ● |
| 2 | 75 | 345 | 0.97 | -0.26 | |
| 3 | 105 | 15 | 0.97 | 0.26 | |
| 4 | 135 | 45 | 0.71 | 0.71 | ● |
| 5 | 165 | 75 | 0.26 | 0.97 | |
| 6 | 195 | 105 | -0.26 | 0.97 | |
| 7 | 225 | 135 | -0.71 | 0.71 | ● |
| 8 | 255 | 165 | -0.97 | 0.26 | |
| 9 | 285 | 195 | -0.97 | -0.26 | |
| 10 | 315 | 225 | -0.71 | -0.71 | ● |
| 11 | 345 | 255 | -0.26 | -0.97 | |

FIG. 4A  INITIAL OPERATION

| No. | ANGLE OF sin θ | | VALUE OF sin θ | | DATA | |
|---|---|---|---|---|---|---|
| | A PHASE | B PHASE | A PHASE | B PHASE | A PHASE | B PHASE |
| 0 | 15 | 285 | 0.26 | -0.97 | 33 | -124 |
| 1 | 45 | 315 | 0.71 | -0.71 | 91 | -91 |
| 2 | 75 | 345 | 0.97 | -0.26 | 124 | -33 |
| 3 | 105 | 15 | 0.97 | 0.26 | 124 | 33 |
| 4 | 135 | 45 | 0.71 | 0.71 | 91 | 91 |
| 5 | 165 | 75 | 0.26 | 0.97 | 33 | 124 |
| . | . | . | . | . | . | . |
| . | . | . | . | . | . | . |
| 11 | 345 | 255 | -0.26 | -0.97 | -33 | -124 |

FIG. 4B  NORMAL OPERATION

| No. | ANGLE OF sin θ | | VALUE OF sin θ | | DATA | |
|---|---|---|---|---|---|---|
| | A PHASE | B PHASE | A PHASE | B PHASE | A PHASE | B PHASE |
| 0 | 15 | 285 | 0.26 | -0.97 | 31 | -116 |
| 1 | 45 | 315 | 0.71 | -0.71 | 85 | -85 |
| 2 | 75 | 345 | 0.97 | -0.26 | 116 | -31 |
| 3 | 105 | 15 | 0.97 | 0.26 | 116 | 31 |
| 4 | 135 | 45 | 0.71 | 0.71 | 85 | 85 |
| 5 | 165 | 75 | 0.26 | 0.97 | 31 | 116 |
| . | . | . | . | . | . | . |
| . | . | . | . | . | . | . |
| 11 | 345 | 255 | -0.26 | -0.97 | -31 | -116 |

FIG. 4C  POWER-DOWN OPERATION

| No. | ANGLE OF sin θ | | VALUE OF sin θ | | DATA | |
|---|---|---|---|---|---|---|
| | A PHASE | B PHASE | A PHASE | B PHASE | A PHASE | B PHASE |
| 0 | 15 | 285 | 0.26 | -0.97 | 25 | -94 |
| 1 | 45 | 315 | 0.71 | -0.71 | 69 | -69 |
| 2 | 75 | 345 | 0.97 | -0.26 | 94 | -25 |
| 3 | 105 | 15 | 0.97 | 0.26 | 94 | 25 |
| 4 | 135 | 45 | 0.71 | 0.71 | 69 | 69 |
| 5 | 165 | 75 | 0.26 | 0.97 | 25 | 94 |
| . | . | . | . | . | . | . |
| . | . | . | . | . | . | . |
| 11 | 345 | 255 | -0.26 | -0.97 | -25 | -94 |

FIG. 4D  STATIC OPERATION

| No. | ANGLE OF sin θ | | VALUE OF sin θ | | DATA | |
|---|---|---|---|---|---|---|
| | A PHASE | B PHASE | A PHASE | B PHASE | A PHASE | B PHASE |
| 0 | 15 | 285 | 0.26 | -0.97 | 17 | -62 |
| 1 | 45 | 315 | 0.71 | -0.71 | 45 | -45 |
| 2 | 75 | 345 | 0.97 | -0.26 | 62 | -17 |
| 3 | 105 | 15 | 0.97 | 0.26 | 62 | 17 |
| 4 | 135 | 45 | 0.71 | 0.71 | 45 | 45 |
| 5 | 165 | 75 | 0.26 | 0.97 | 17 | 62 |
| . | . | . | . | . | . | . |
| . | . | . | . | . | . | . |
| 11 | 345 | 255 | -0.26 | -0.97 | -17 | -62 |

FIG. 7A  INITIAL OPERATION/LEAD ANGLE 1.5°

| No. | ANGLE OF sin θ | | VALUE OF sin θ | | DATA | |
|---|---|---|---|---|---|---|
| | A PHASE | B PHASE | A PHASE | B PHASE | A PHASE | B PHASE |
| 0 | 16.5 | 286.5 | 0.28 | -0.96 | 36 | -123 |
| 1 | 46.5 | 316.5 | 0.73 | -0.69 | 93 | -88 |
| 2 | 76.5 | 346.5 | 0.97 | -0.23 | 124 | -29 |
| 3 | 106.5 | 16.5 | 0.96 | 0.28 | 123 | 36 |
| 4 | 136.5 | 46.5 | 0.69 | 0.73 | 88 | 93 |
| 5 | 166.5 | 76.5 | 0.23 | 0.97 | 29 | 124 |
| ... | ... | ... | ... | ... | ... | ... |
| 11 | 346.5 | 256.5 | -0.28 | -0.96 | -36 | -123 |

FIG. 7B  NORMAL OPERATION/LEAD ANGLE 1.5°

| No. | ANGLE OF sin θ | | VALUE OF sin θ | | DATA | |
|---|---|---|---|---|---|---|
| | A PHASE | B PHASE | A PHASE | B PHASE | A PHASE | B PHASE |
| 0 | 16.5 | 286.5 | 0.28 | -0.96 | 34 | -115 |
| 1 | 46.5 | 316.5 | 0.73 | -0.69 | 88 | -83 |
| 2 | 76.5 | 346.5 | 0.97 | -0.23 | 116 | -28 |
| 3 | 106.5 | 16.5 | 0.96 | 0.28 | 115 | 34 |
| 4 | 136.5 | 46.5 | 0.69 | 0.73 | 83 | 88 |
| 5 | 166.5 | 76.5 | 0.23 | 0.97 | 28 | 116 |
| ... | ... | ... | ... | ... | ... | ... |
| 11 | 346.5 | 256.5 | -0.28 | -0.96 | -34 | -115 |

FIG. 7C  POWER-DOWN OPERATION/LEAD ANGLE 1.5°

| No. | ANGLE OF sin θ | | VALUE OF sin θ | | DATA | |
|---|---|---|---|---|---|---|
| | A PHASE | B PHASE | A PHASE | B PHASE | A PHASE | B PHASE |
| 0 | 16.5 | 286.5 | 0.28 | -0.96 | 27 | -93 |
| 1 | 46.5 | 316.5 | 0.73 | -0.69 | 71 | -67 |
| 2 | 76.5 | 346.5 | 0.97 | -0.23 | 94 | -22 |
| 3 | 106.5 | 16.5 | 0.96 | 0.28 | 93 | 27 |
| 4 | 136.5 | 46.5 | 0.69 | 0.73 | 67 | 71 |
| 5 | 166.5 | 76.5 | 0.23 | 0.97 | 22 | 94 |
| ... | ... | ... | ... | ... | ... | ... |
| 11 | 346.5 | 256.5 | -0.28 | -0.96 | -27 | -93 |

FIG. 7D  STATIC OPERATION/LEAD ANGLE 1.5°

| No. | ANGLE OF sin θ | | VALUE OF sin θ | | DATA | |
|---|---|---|---|---|---|---|
| | A PHASE | B PHASE | A PHASE | B PHASE | A PHASE | B PHASE |
| 0 | 16.5 | 286.5 | 0.28 | -0.96 | 18 | -61 |
| 1 | 46.5 | 316.5 | 0.73 | -0.69 | 47 | -44 |
| 2 | 76.5 | 346.5 | 0.97 | -0.23 | 62 | -15 |
| 3 | 106.5 | 16.5 | 0.96 | 0.28 | 61 | 18 |
| 4 | 136.5 | 46.5 | 0.69 | 0.73 | 44 | 47 |
| 5 | 166.5 | 76.5 | 0.23 | 0.97 | 15 | 62 |
| ... | ... | ... | ... | ... | ... | ... |
| 11 | 346.5 | 256.5 | -0.28 | -0.96 | -18 | -61 |

STEPPER MOTOR CONTROLLING APPARATUS AND PEN RECORDER

CROSS-REFERENCE TO RELATED APPLICATIONS

This application is based upon and claims the benefit of priority from the prior Japanese Patent Applications No. 2004-364181, filed on Dec. 16, 2004, the entire contents of which are incorporated herein by reference.

BACKGROUND OF THE INVENTION

1. Field of the Invention

The present invention relates to a stepper motor controlling apparatus and a pen recorder using the same and, more particularly, a stepper motor controlling apparatus for use in closed loop control using an encoder and a pen recorder using the same.

2. Description of the Related Art

The stepper motor can carry out the open loop control based on the pulse signal, and a rotation angle of the motor agrees with an input pulse number. However, in the operation executed under the open loop control, in some cases a displacement is caused due to the out of step at the time of high-speed rotation. Therefore, in order to deal with this problem, the controlling apparatus for carrying out the closed loop control by using the stepper motor to which an encoder is attached has been proposed in the related art.

FIG. 8 is a configurative view of a stepper motor controlling apparatus in the related art. In FIG. 8, an encoder disk 2 with five blades is fitted to a motor shaft of a stepper motor 1 by the press fitting to have a predetermined relation with a motor excitation position. A rotation of this encoder disk 2 is sensed by two photo sensors 3a, 3b. Output signals of the photo sensors 3a, 3b are input into an encoder circuit 4, and the rotation direction and the number of revolution of the encoder disk 2 are sensed. Therefore, an absolute position of a moving object (not shown) that moves in response to the rotation of the stepper motor 1 can be sensed. An output signal of the encoder circuit 4 is input into a digital circuit 5 prepared as an ASIC. The digital circuit 5 executes the closed loop control in such a manner that the stepper motor 1 is rotated/driven in a predetermined direction to eliminate a difference (deviation) between absolute position data of the moving object input from the encoder circuit 4 and positioning data input from a CPU 6.

In the pen recorder, for example, the pen position control is executed by the servo system under closed loop control using the stepper motor to which an encoder is attached. That is, a measuring/recording signal is converted into digital data by an A/D converter (not shown) and input into the CPU 6. The CPU 6 generates positioning data in response to a magnitude of a value of the measuring/recording signal and inputs the data into the digital circuit 5. The present position data of the pen is also input into the digital circuit 5 via the encoder circuit 4. The digital circuit 5 inputs a two-phase excitation signal into a driver 7 to drive the stepper motor 1 in the two-phase excitation system, and executes the position control such that the pen as the moving object is moved to follow up the positioning data that responds to the magnitude of the value of the measuring/recording signal. Accordingly, a changing condition of the measuring/recording signal is recorded as a continuous line segment by the pen on a recording paper.

As the stepper motor drive system capable of switching the two-phase excitation drive and the micro step drive smoothly at a high speed, there was the system set forth in JP-A-8-149892, for example.

Also, as the stepper motor controlling apparatus capable of realizing high-precision positioning, high-speed transfer, and small oscillation characteristic of the stepper motor, there was the system set forth in JP-A-10-150798, for example.

JP-A-8-149892 and JP-A-10-150798 are referred to as related art.

However, following problems lay in the related art shown in FIG. 8.

In case the stepper motor is driven under the closed loop control while sensing the position of the motor by the encoder, the motor driving pulse is generated from the encoder position sensing pulse generated by the closed loop control. As a result, the motor driving circuit becomes simple but it is impossible to execute the speed control.

Also, in the case of the two-phase excitation drive, the motor makes a step-like motion when viewed microscopically. As a result, the rotation of the motor is not smooth and thus it is impossible to move smoothly the moving object.

SUMMARY OF THE INVENTION

An object of the present invention is to provide a stepper motor controlling apparatus and a pen recorder using the same, capable of carrying out high-precision positioning and high-speed moving at low consumption power.

The invention provides a stepper motor controlling apparatus, having: a driver which drives a stepper motor in response to an input pulse signal; a PWM controlling section which changes a duty ratio of the pulse signal fed to the driver to control a rotation of the stepper motor; a pulse encoder which rotates in response to the rotation of the stepper motor, and outputs a pulse according to a position of a moving object; a position counter which counts the pulse output from the pulse encoder to sense a present position of the moving object; and a pulse rate controlling section which controls an update latency time of the pulse signal according to a deviation between a target position of the moving object and the present position.

In the stepper motor controlling apparatus, the PWM controlling section changes the duty ratio of the pulse signal after the update latency time elapses.

In the stepper motor controlling apparatus, the pulse rate controlling section controls the update latency time based on a pulse rate table specifying the update latency time corresponding to the deviation.

In the stepper motor controlling apparatus, the stepper motor has a plurality of operation modes which correspond to operation states of the stepper motor, and the PWM controlling section identifies an operation mode of the stepper motor, and limits a maximum pulse width of the pulse signal every operation modes.

In the stepper motor controlling apparatus, the PWM controlling section controls the rotation of the stepper motor based on a phase PWM table set defining a maximum pulse width of the pulse signal every operation modes of the stepper motor, the phase PWM table set includes a plurality of phase PWM tables whose maximum pulse widths are different each other, and the PWM controlling section uses a phase PWM table corresponding to the operation mode of the stepper motor.

In the stepper motor controlling apparatus, the plurality of operation modes includes an initial operation mode, a normal operation mode, a power-down operation mode, and a static operation mode.

In the stepper motor controlling apparatus, the PWM controlling section identifies an operation mode based on the deviation.

In the stepper motor controlling apparatus, each phase PWM table corresponding to each operation mode of the stepper motor includes a plurality of lead angle PWM tables whose lead angles are different each other, and the PWM controlling section selects an optimum lead angle PWM table, which achieves the smallest difference of speed between rotation directions of the stepper motor, among the plurality of lead angle PWM tables, to use the optimum lead angle PWM table.

In the stepper motor controlling apparatus, the driver performs a micro step drive in the initial operation mode, the power-down operation mode, and the static operation mode, and performs a two-phase excitation drive in the normal operation mode.

The invention also provides a pen recorder, having: a driver which drives a stepper motor, which moves a pen, in response to an input pulse signal; a PWM controlling section which changes a duty ratio of the pulse signal fed to the driver to control a rotation of the stepper motor; a pulse encoder which rotates in response to the rotation of the stepper motor, and outputs a pulse according to a position of the pen; a position counter which counts the pulse output from the pulse encoder to sense a present position of the pen; and a pulse rate controlling section which controls an update latency time of the pulse signal according to a deviation between a target position of the pen in response to a magnitude of a measuring/recording signal and the present position.

Following advantages can be achieved by the stepper motor controlling apparatus and the pen recorder.

Since the rate of the pulse signal fed to the driver is controlled according to the deviation between the target position of the moving object and the present position, the speed control can be executed. Also, since the two-phase excitation drive and the micro step drive are switched, the high-precision positioning and the high-speed motion of the stepper motor can be achieved.

Also, the micro step drive, the speed control, and the power-down control of the stepper motor are carried out by switching the previously set values of the table without the CPU operation. Therefore, the load of the CPU can be reduced.

Also, since the maximum pulse width of the pulse signal is limited according to the operation condition of the stepper motor, the driving current can be suppressed and also a consumption power can be reduced.

Also, since the correction using the table in which the lead angle correction is employed is applied, the difference of speed according to the rotation direction of the stepper motor can be reduced.

In addition, since such stepper motor controlling apparatus is used in the pen position control of the pen recorder, the pen of the pen recorder can be moved to the target position at a high speed and high precision in response to the value of the measuring/recording signal.

BRIEF DESCRIPTION OF THE DRAWINGS

FIG. 2 is a view explaining a pulse rate table;

FIGS. 4A to 4D are views explaining the phase PWM tables;

FIGS. 7A to 7D are views explaining the lead angle phase PWM tables; and

DETAILED DESCRIPTION OF THE PREFERRED EMBODIMENTS

An embodiment of the present invention will be explained in detail with reference to the drawings hereinafter.

Figure 1:
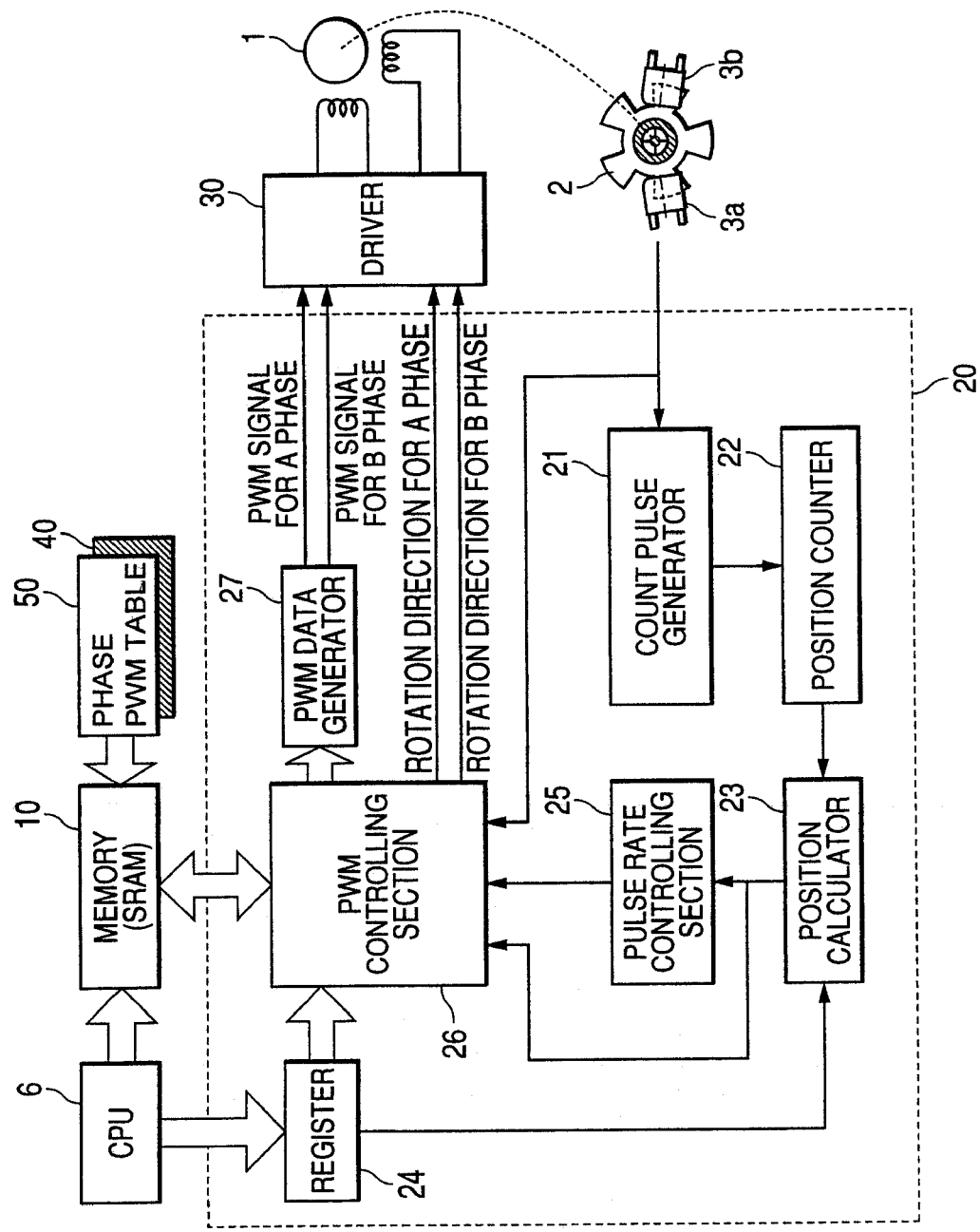
FIG. 1 is a configurative view showing an embodiment of the present invention.

FIG. 1 is a configurative view showing an embodiment of the present invention. The case where a stepper motor controlling apparatus is used in the pen position control of the pen recorder will be explained. A measuring/recording signal is converted into digital data by an A/D converter (not shown) and input in the CPU 6. The CPU 6 generates positioning data in response to a magnitude of a value of the measuring/recording signal, and then inputs the data into a memory 10 and a digital circuit 20 constructed as an ASIC internal circuit. The present position data of the pen, which is derived based on a rotation sensing signal of the encoder disk 2, is also input into the digital circuit 20. The digital circuit 20 inputs a drive control signal into a driver 30 to drive the stepper motor 1, and executes the position control in such a manner that the pen as the moving object moves to follow up positioning data that responds to the magnitude of the value of the measuring/recording signal. Therefore, the changing condition of the measuring/recording signal is recorded as the continuous line segment by the pen on the recording paper.

The stepper motor 1 rotates since an exciting coil is driven in response to an input pulse signal of the driver 30.

The encoder disk 2 with five blades, for example, is fitted to the motor shaft of the stepper motor 1 by the press fitting to have a predetermined relation with the motor excitation position. The rotation of the encoder disk 2 is sensed by two photo sensors 3a, 3b that are arranged to generate a predetermined phase difference in sensing signals. Sensed signals of two photo sensors 3a, 3b are input into a count pulse generating section 21 in the digital circuit 20 to generate a pulse signal. An output pulse of the count pulse generating section 21 is input into a position counter 22, so that the rotation direction is sensed and the present position is counted.

A position calculator 23 calculates a difference (deviation) between a target position of the pen (not shown) derived based on the magnitude of the value of the measuring/recording signal, which is loaded into a register 24 from the CPU 6, and the present position derived based on the count value of the position counter 22.

A pulse rate controlling section 25 executes a rate limitation that differentiates an updated period of the pulse signal depending on whether a deviation of the present position from the target position is large or small.

A PWM controlling section 26 updates the rotation direction and PWM data based on an output of the position calculator 23 and an output of the encoder, and decides the rotation and the stop of the stepper motor 1. A pulse rate table 40 and a phase PWM table 50 that are expanded in the memory 10 are used in executing this control. Here, the pulse rate table 40 gives a table that correlates the deviation between the target position and the present position with an update latency time in which a rate of the pulse signal is changed, and the phase PWM table 50 gives a table that expresses a duty of the phase-on pulse signal.

Rotation direction signals of the stepper motor 1 generated by the PWM controlling section 26 and pulse signals generated by a PWM data generator 27 are sent to the driver 30.

FIG. 2 is a view explaining the pulse rate table. The update latency time in which the rate of the pulse signal is changed is increased as the deviation between the target position of the pen and the present position is reduced.

In the case in FIG. 2, the two-phase excitation drive is executed without the update latency time when the deviation is large to exceed 64 or more. Then, the micro step drive is applied when the deviation is reduced small. Thus, the update latency time is selected from the table in response to the deviation.

Figures 3A, 3B:
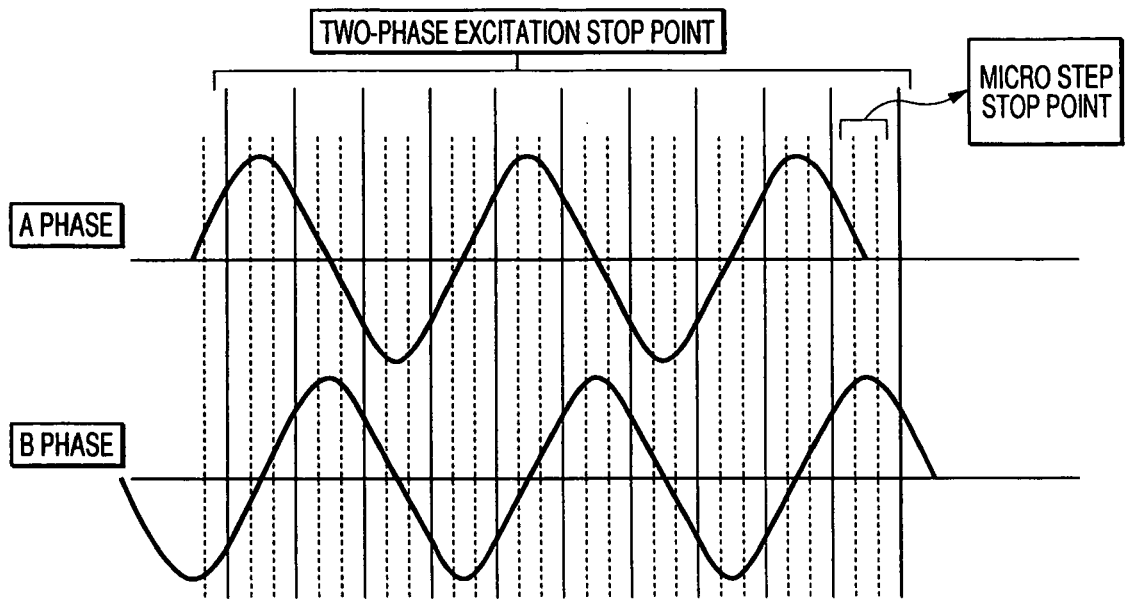
FIG. 3A is a view showing a micro step driving current.
FIG. 3B is a view showing a concept of the phase PWM table.

FIGS. 3A and 3B explain the micro step drive based on the phase PWM table. FIG. 3A is a view showing a micro step driving current, and FIG. 3B is a view showing a concept of the phase PWM table.

In the case of the two-phase excitation drive, such drive is switched at points Nos. 1, 4, 7, 10 in FIG. 3B and the motor is operated. In the case of the micro step drive, such drive is switched by changing sequentially points Nos. 0 to 11 one by one. The rotation direction of the stepper motor is changed when the points Nos. 0 to 11 are switched in ascending order and theses points are switched in descending order.

FIGS. 4A to 4D are views explaining the phase PWM tables. FIG. 4A shows a concrete example of a phase PWM table in an initial operation, FIG. 4B shows a concrete example of a phase PWM table in a normal operation, FIG. 4C shows a concrete example of a phase PWM table in a power-down operation, and FIG. 4D shows a concrete example of a phase PWM table in a static operation.

The magnitude of the necessary driving current is different in answer to the operation condition of the stepper motor. Therefore, a reduction in the consumption power can be achieved when the driving current is controlled appropriately in response to the operation condition.

Such magnitude control of the driving current can be accomplished by changing a duty of the pulse signal that is input into the driver 30. FIGS. 4A to 4D show examples when the data value at the time of 100% duty is set to "255". Respective data values are shown when the 50% duty is set in the initial operation, the 47% duty is set in the normal operation, the 38% duty is set in the power-down operation, and the 25% duty is set in the static operation.

In the initial operation, the pen is moved to a position of a stopper on the 0% side at a low speed to come into touch with the stopper. Then, it is sensed that the rotation of the encoder disk 2 is stopped, and the position is set as a zero position. Therefore, in order to move surely the pen up to the stopper, the phase PWM table having the largest driving current is used.

The normal operation is taken in a high-speed movement when the deviation between the target position of the pen and the present position is large. Therefore, the large driving current is required to some extent because the motor is rotated by two-phase excitation drive at a high speed.

The power-down operation is taken in a decelerating movement when the deviation between the target position of the pen and the present position is small. Therefore, the motor is rotated by the micro step drive, and the driving current can reduced small.

The static operation is taken when the pen arrives at the target position. Therefore, the phase PWM table having the smallest driving current is used.

In FIGS. 4A to 4D, respective phase PWM tables specify Data in an A phase and a B phase over Nos. 0 to 11 respectively. In the A phase, Data in the A phase are specified from No. 0 to No. 5 and then Data from No. 6 to No. 11 may be obtained affixing the opposite polarity. In the B phase, Data can also be obtained by shifting the phase by −90° from the A phase.

Figure 5:
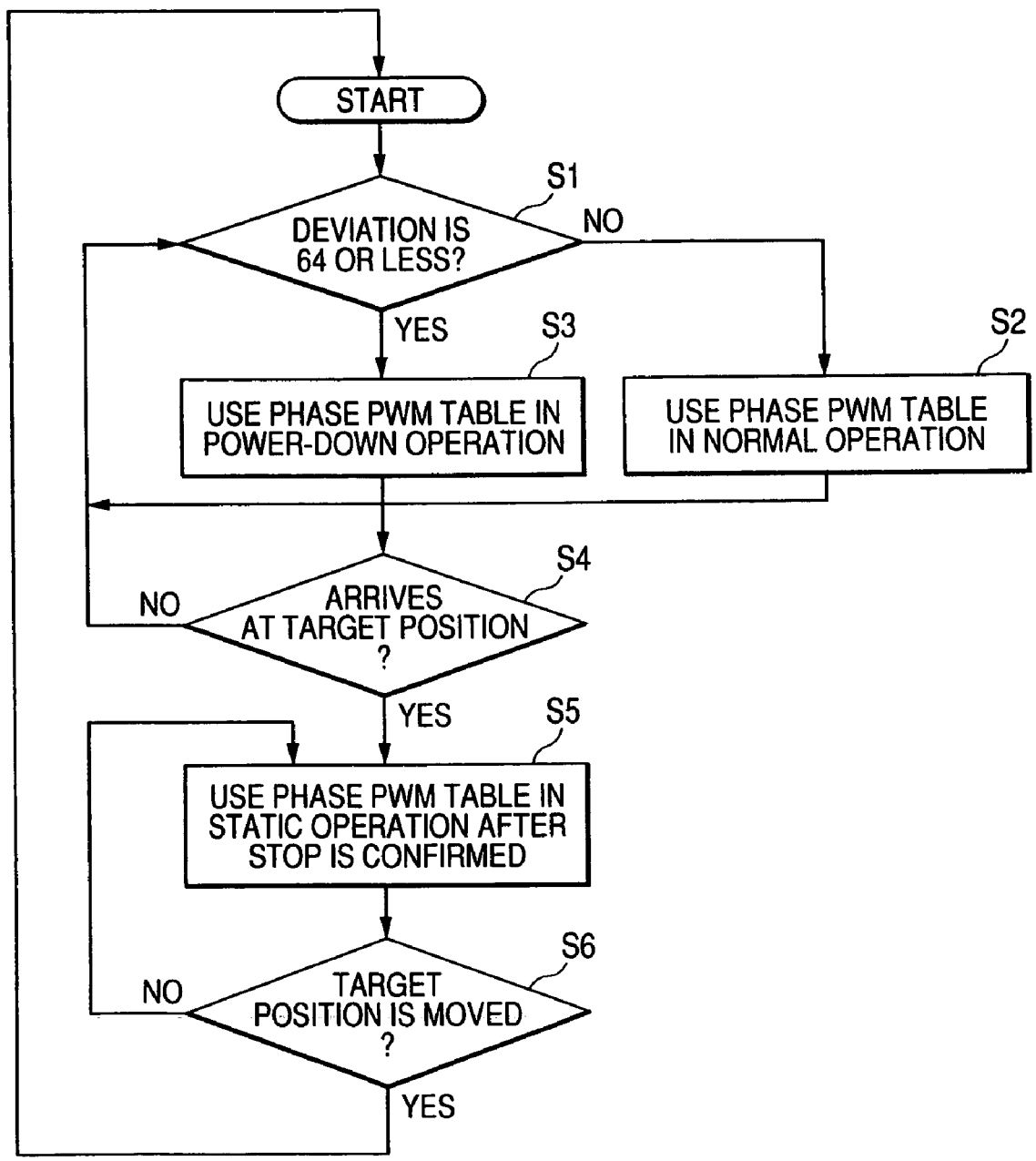
FIG. 5 is a flowchart showing transition procedures of the phase PWM table.

FIG. 5 is a flowchart showing transition procedures of the phase PWM table.

It is decided whether the deviation between the target position of the pen and the present position is larger than a specified value (e.g., 64) or smaller (step S1).

When the deviation between the target position of the pen and the present position is larger than the specified value, the phase PWM table in the normal operation is used, and then the use of the phase PWM table in the normal operation is kept until the deviation is reduced smaller than the specified value (step S2).

When the deviation between the target position of the pen and the present position is smaller than the specified value, the phase PWM table in the power-down operation is used (step S3).

When the pen arrives at the target position (step S4), the phase PWM table in the static operation is used (step S5). The use of the phase PWM table in the static operation is still kept until the target position is moved (step S6).

Figure 6:
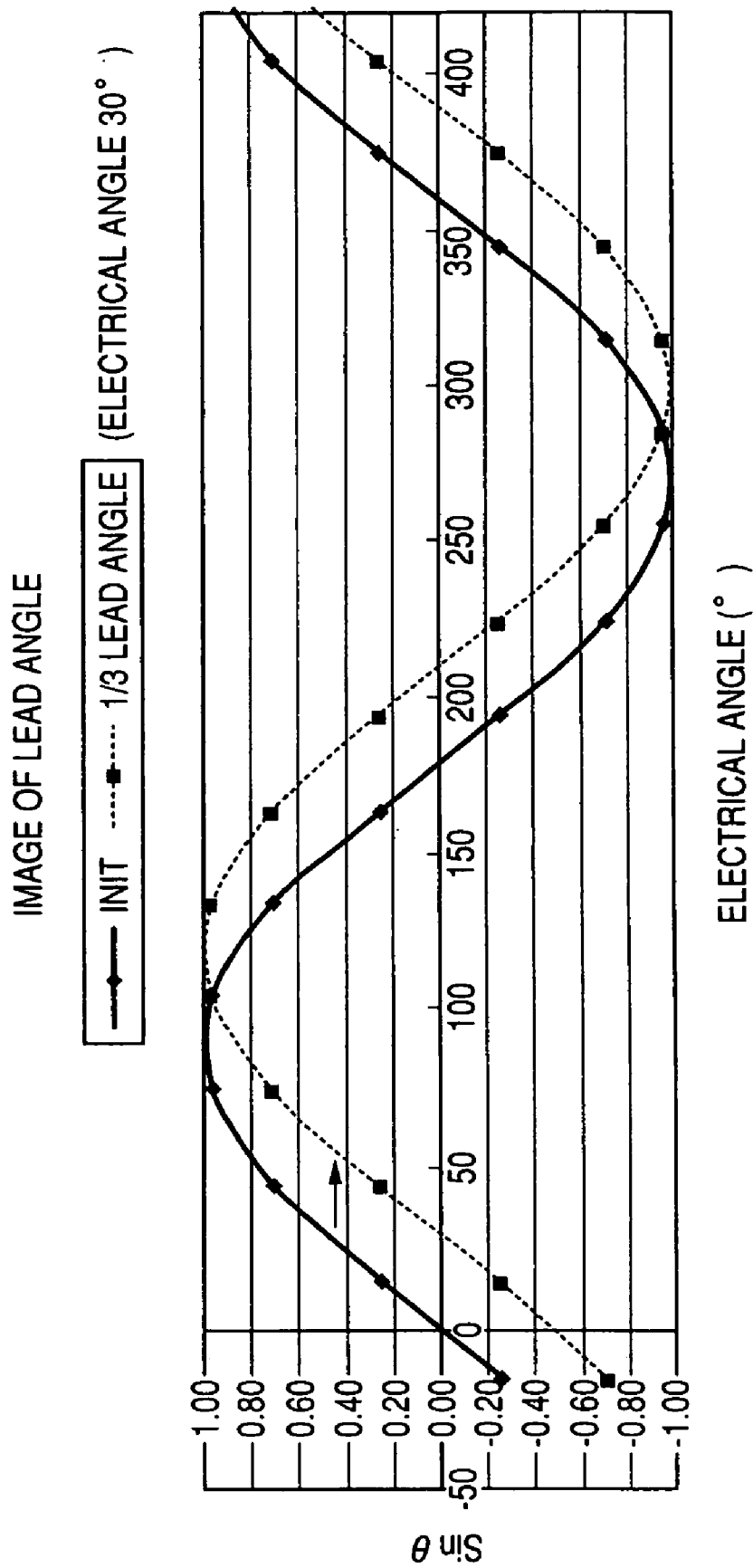
FIG. 6 is a view showing an image of a lead angle.
Figure 8:
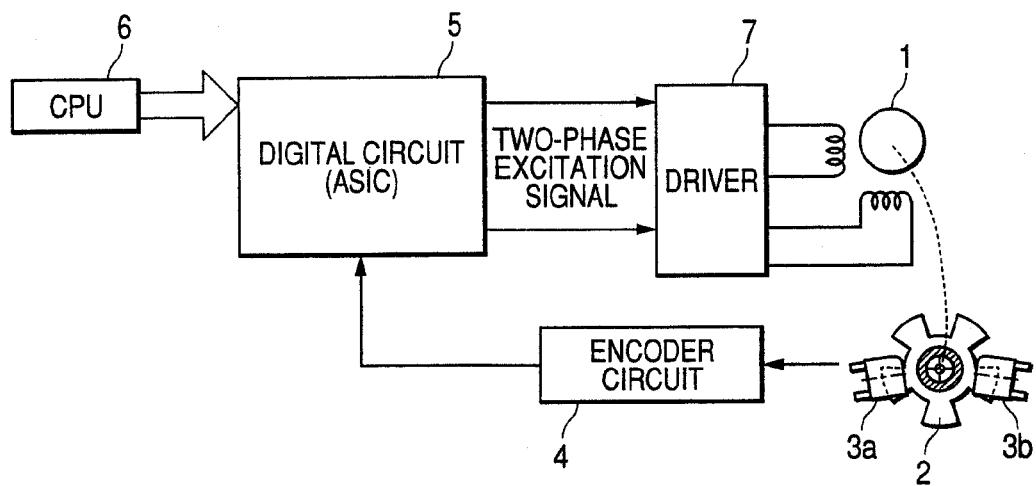
FIG. 8 is a configurative view of a stepper motor controlling apparatus in the related art.

FIG. 6 is a view showing an image of a lead angle.

In case the encoder disk 2 is not ideally fitted to the exciting phase of the stepper motor 1, a difference of speed is caused between the clockwise rotation and the counter-clockwise rotation of the stepper motor 1. Therefore, the correction is applied by the lead angle control to eliminate this difference of speed. Since the lead angle is corrected to accelerate the lagged rotation, the led rotation is lagged conversely.

FIGS. 7A to 7D are views explaining the lead angle phase PWM tables.

FIGS. 7A to 7D show examples of the phase PWM tables to which the lead angle correction is applied. Also, a plurality of tables having the different lead angle respectively are prepared in advance. In adjusting the pen position, the lead angle phase PWM table is switched to select the optimal table that can achieve the smallest difference of speed between the clockwise rotation direction and the counter-clockwise rotation direction, and then the optimal table is stored as the adjust value.

With such configuration, the pen of the pen recorder can be moved to the target position, which meets to the value of the measuring/recording signal, at a high speed and high precision.

As the process of the CPU 6 required to execute a pen servo motor operation necessary for the pen recorder, only the loading of the target position data, which is the measuring/recording signal converted into the digital signal, into the register 24 is needed after the pulse rate table 40 and the phase PWM table 50 are expanded in the memory 10 at first. Thus, the load of the CPU necessary for the pen position control can be reduced widely.

The present invention has such a feature that the load of the CPU 6 is lessened by digital-processing the pen position control by means of the digital circuit 20 prepared as ASIC. In this event, if the finer process is carried out by the CPU 6, the smoother pen servo action can be realized.

The driving current of the stepper motor is PWM-controlled, and then is decreased in power as soon as the operation is switched from the two-phase excitation drive to the micro step drive. Then, the driving current is reduced further after the movement of the pen is stopped. Therefore, a temperature rise of the exciting coil of the motor can be suppressed below a predetermined temperature.

The pen can be stopped at the target position with high precision. In the case where the stepper motor is driven by the micro step drive system using the phase PWM table 50 in this example, when a resolution of the encoder disk 2 (resolution at the two-phase excitation point of the motor 2) is set to 0.1 mm, for example, the stepper motor can be stopped at a resolution (about 33 μm) that is ⅓ of the above resolution.

In case a difference in the moving speed of the pen is caused due to the error in the assembling operation, or the like according to the rotation direction, such difference in the moving speed can be reduced below a certain constant value by applying the lead angle correction. Thus, the stable recording operation can be realized.

The speed control to move the pen is executed by using the pulse rate table. Therefore, the motor is driven by the micro step drive system and the pen is moved at a high speed when the position of the pen is far from the target position, while the operation is switched to the micro step drive to decelerate gradually and stop the motor when the position of the pen comes close to the target position. As a result, both the high-speed movement and the high-precision positioning can be attained.

In this case, the moving object is not limited to the pen of the recorder explained in the embodiment. According to the feature of the present invention such that at first the moving object can be moved to the target position at a high speed and then the speed of the moving object is decelerated and then stopped when the moving object comes close to the target position, any moving object may be operated if such object is light in weight.

For example, in the assembly line of the parts, or the like, the sensor (moving object) used in the profile inspection of the parts can be moved by using the stepper motor controlling apparatus of the embodiment.

Also, as the mechanism for moving an indicator of the analog meter vertically and horizontally, the present invention may be incorporated into the system, or the like and used there.

What is claimed is:

1. A stepper motor controlling apparatus, comprising:
a driver which drives a stepper motor in response to an input pulse signal;
a PWM controlling section which changes a duty ratio of the pulse signal fed to the driver to control a rotation of the stepper motor;
a pulse encoder which rotates in response to the rotation of the stepper motor, and outputs a pulse according to a position of a moving object;
a position counter which counts the pulse output from the pulse encoder to sense a present position of the moving object; and
a pulse rate controlling section which controls an update latency time of the pulse signal according to a deviation between a target position of the moving object and the present position.

2. The stepper motor controlling apparatus according to claim 1,
wherein the PWM controlling section changes the duty ratio of the pulse signal after the update latency time elapses.

3. The stepper motor controlling apparatus according to claim 1,
wherein the pulse rate controlling section controls the update latency time based on a pulse rate table specifying the update latency time corresponding to the deviation.

4. The stepper motor controlling apparatus according to claim 1,
wherein the stepper motor has a plurality of operation modes which correspond to operation states of the stepper motor, and
the PWM controlling section identifies an operation mode of the stepper motor, and limits a maximum pulse width of the pulse signal every operation modes.

5. The stepper motor controlling apparatus according to claim 4,
wherein the PWM controlling section controls the rotation of the stepper motor based on a phase PWM table set defining a maximum pulse width of the pulse signal every operation modes of the stepper motor,
the phase PWM table set includes a plurality of phase PWM tables whose maximum pulse widths are different each other, and
the PWM controlling section uses a phase PWM table corresponding to the operation mode of the stepper motor.

6. The stepper motor controlling apparatus according to claim 4,
wherein the plurality of operation modes includes an initial operation mode, a normal operation mode, a power-down operation mode, and a static operation mode.

7. The stepper motor controlling apparatus according to claim 4,
wherein the PWM controlling section identifies an operation mode based on the deviation.

8. The stepper motor controlling apparatus according to claim 5,
wherein each phase PWM table corresponding to each operation mode of the stepper motor includes a plurality of lead angle PWM tables whose lead angles are different each other, and
the PWM controlling section selects an optimum lead angle PWM table, which achieves the smallest difference of speed between rotation directions of the stepper motor, among the plurality of lead angle PWM tables, to use the optimum lead angle PWM table.

9. The stepper motor controlling apparatus according to claim 6,
wherein the driver performs a micro step drive in the initial operation mode, the power-down operation mode, and the static operation mode, and performs a two-phase excitation drive in the normal operation mode.

10. A pen recorder, comprising:
a driver which drives a stepper motor, which moves a pen, in response to an input pulse signal;
a PWM controlling section which changes a duty ratio of the pulse signal fed to the driver to control a rotation of the stepper motor;
a pulse encoder which rotates in response to the rotation of the stepper motor, and outputs a pulse according to a position of the pen;
a position counter which counts the pulse output from the pulse encoder to sense a present position of the pen; and a pulse rate controlling section which controls an update latency time of the pulse signal according to a deviation between a target position of the pen in response to a magnitude of a measuring/recording signal and the present position.

11. The stepper motor controlling apparatus according to claim 1, wherein said update latency time is a time in which the rate of the pulse signal is changed.

12. The stepper motor controlling apparatus according to claim 10, wherein said update latency time is a time in which the rate of the pulse signal is changed.

13. The stepper motor controlling apparatus according to claim 9, wherein a driving current of the stepper motor is decreased once an operation is switched from the two-phase excitation drive to the micro step drive.

* * * * *